W. T. HENSLEY.
COMBINED ENGINE STARTER CLUTCH AND FLY WHEEL.
APPLICATION FILED JULY 24, 1914.
1,269,708.
Patented June 18, 1918.
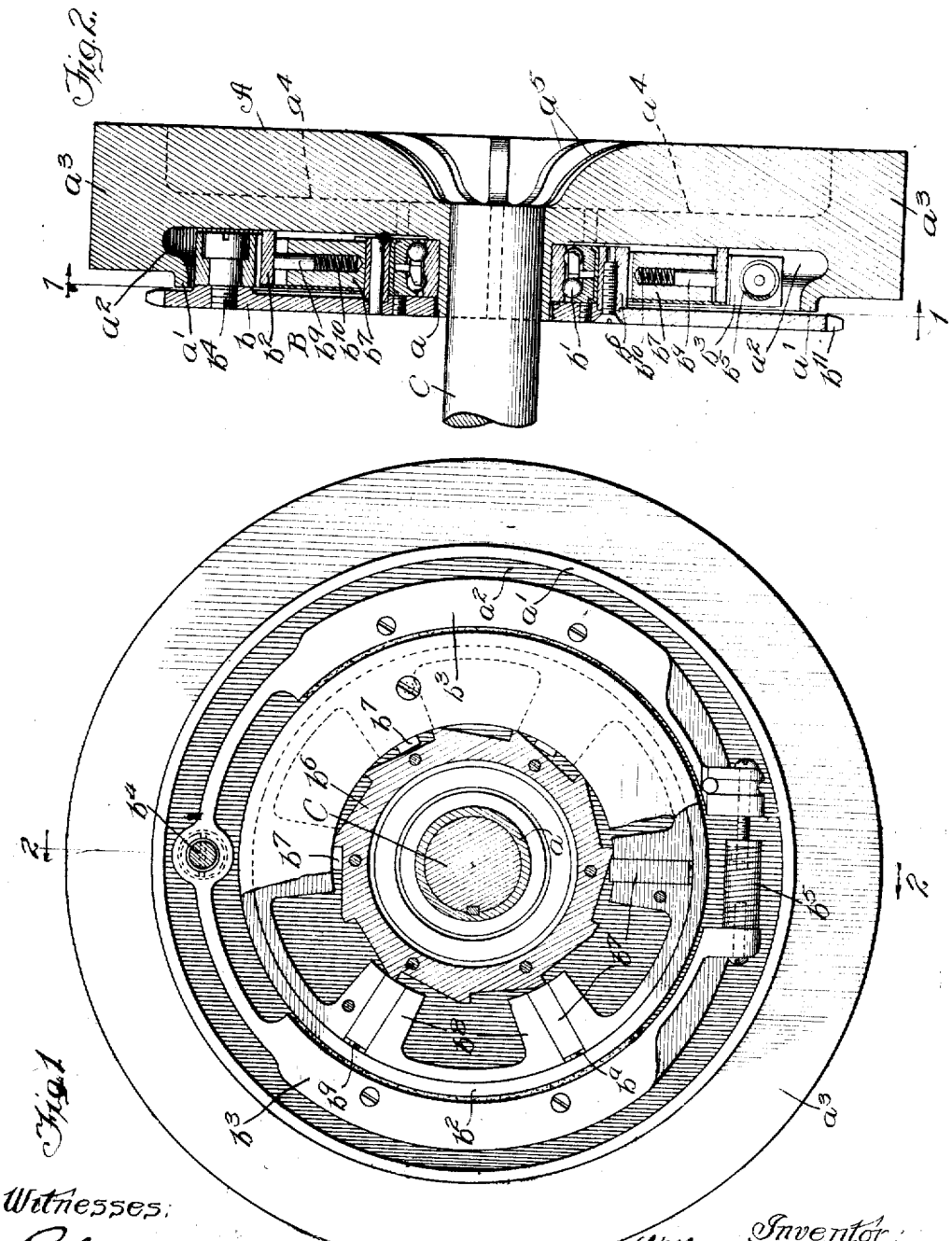

UNITED STATES PATENT OFFICE.

WILLIAM T. HENSLEY, OF BOUNDBROOK, NEW JERSEY, ASSIGNOR, BY MESNE ASSIGNMENTS, TO BOUND BROOK ENGINE & MFG. CO., A CORPORATION OF DELAWARE.

COMBINED ENGINE-STARTER CLUTCH AND FLY-WHEEL.

1,269,708.  Specification of Letters Patent.  Patented June 18, 1918.

Application filed July 24, 1914. Serial No. 852,844.

*To all whom it may concern:*

Be it known that I, WILLIAM T. HENSLEY, a citizen of the United States of America, and resident of Boundbrook, Somerset county, New Jersey, have invented a certain new and useful Improvement in Combined Engine-Starter Clutches and Fly-Wheels, of which the following is a specification.

My invention relates to clutches for automatically controlling the reciprocal operation of the engine and the motor generator of electrical starters for the internal combustion engines of automobiles or other vehicles.

The object of my invention is to provide a unitary mechanism which will serve as both the clutch for the transmission and the fly-wheel of the engine, thereby reducing the length of shaft necessary for the engine, and obviating the necessity of providing separate shaft connections for the clutch and fly-wheel, as well as rendering the structure more compact than heretofore.

To this and other useful ends my invention consists in matters hereinafter set forth and claimed, but I do not limit myself to the exact construction shown and described.

In the accompanying drawings—

Figure 1 is a section on line 1—1 in Fig. 2, showing a combined clutch mechanism and engine fly-wheel embodying the principles of my invention.

Fig. 2 is a section on line 2—2 in Fig. 1.

As thus illustrated, my invention comprises a fly-wheel A having a hub $a$ which is suitably secured to the shaft C of the internal combustion engine. This hub is preferably on the inner side of the wheel, and this same side of the wheel has a flange $a^1$, a recess $a^2$ being formed between this hub and flange on the inner side of the wheel. The rim $a^3$ of the wheel is of some weight, and the web $a^4$ is reinforced and weighted on its outer surface by radial ribs $a^5$ of any suitable shape and character. It will also be seen that the outer edge of the flange $a^1$ is desirably spaced a distance from the side of the wheel.

The clutch mechanism B, which is disposed in the recess $a^2$, can be of any suitable character. As shown, the essential elements of this clutch mechanism are the sprocket wheel $b$ which is mounted to turn on the fly-wheel hub $a$, a ball bearing $b^1$ being interposed between the two in any suitable or desired manner. The flange $b^2$ is rigidly secured to the fly-wheel and is engaged by the curved brake shoes $b^3$ which have their ends pivoted at $b^4$ upon the inner side of the said sprocket wheel. The other ends of these two brake shoes are drawn together by a spring $b^5$, whereby said shoes exert a yielding pressure upon the flange $b^2$, the tension of said spring being adjustable in any suitable or desired manner. When the speed becomes too great, after the engine has started, these brake shoes are thrown outward by centrifugal force, thus reducing their pressure on the flange $b^2$, or entirely disengaging the same, thereby automatically opening the power transmitting connection from the engine to the motor generator, thus serving as a friction clutch. This, as will be readily understood, serves to insure a uniform or constant rate of speed for the motor generator, regardless of variations in the speed of the engine. The toothed ratchet ring $b^6$ is suitably secured to the inner side of the sprocket wheel, immediately outside of the said ball bearing $b^1$, it being concentrically arranged, and is engaged by the ratchet pawls $b^7$ by which the sprocket wheel is enabled to rotate the fly-wheel and thereby start the engine. These pawls $b^7$, it will be seen, are radially arranged and held in slots between the segments or sections $b^8$ of a ring which is suitably secured to the fly-wheel. Each pawl is bored longitudinally to receive a pin $b^9$ which is secured to the flange $b^2$ and which forms an abutment for the spring $b^{10}$, these springs serving to yieldingly present the pawls to the said ratchet ring $b^6$, whereby the sprocket wheel rotates the fly-wheel. It will be seen, however, that centrifugal force will disengage these pawls from the teeth of the ratchet ring $b^6$, whereby the said pawls will not slide and click on the ratchet teeth when the engine is running at full speed, it being borne in mind that at such time the fly-wheel is necessarily rotating faster than the sprocket wheel.

It will be seen that my invention is in the nature of an improvement on the construction and arrangement shown in my copending application Serial No. 831,638, and is designed with special reference to use in an electrical starting apparatus of this particular kind—that is to say, in an electrical starter in which a motor generator first rotates the sprocket wheel on the engine shaft to start the engine, and in which the engine then operates the said motor as a generator to charge the storage battery from which the operating current is derived. With the construction herein shown and described, separate connections between the clutch and the fly-wheel and the engine shaft are not necessary, inasmuch as the fly-wheel itself constitutes the fixed element of the clutch, so that a single shaft connection is sufficient. Moreover, and with a combined fly-wheel and clutch mechanism of the character herein shown and described, less space is occupied than when these two instrumentalities are separate and each complete in itself, and the length of shaft necessary for the arrangement is also reduced to some extent. The fly-wheel is, with this arrangement, nearer the engine.

Regarding the details of construction, it will be understood that the fly-wheel can be keyed to the engine shaft C in any suitable or desired manner. It will also be seen that the teeth $b^{11}$ of the sprocket wheel project beyond the circumference of the flange $a^1$, this flange serving to close the space between the sprocket wheel and fly-wheel.

What I claim as my invention is:—

1. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator.

2. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator, said ratchet including teeth rigid with said member, and pawls carried by the fly-wheel, adapted to engage said teeth.

3. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator, said friction connection including a wearing surface on said fly-wheel, a brake shoe mounted on said member, and yielding means for holding said shoe against said surface in opposition to centrifugal force.

4. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator, said ratchet having a pawl carried by said fly-wheel, said pawl being movable out of operative position by centrifugal force, and said friction connection including a brake shoe governed by centrifugal force carried by said member.

5. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator, said fly-wheel being recessed at one side thereof to receive said ratchet and friction connection, and having an outer portion adjacent said member to prevent access to said recess.

6. A combined fly-wheel and clutch for connecting a motor generator with an internal combustion engine, comprising a fly-wheel fixed on the engine shaft, a clutch member loose on said shaft, arranged for connection with the motor generator, a ratchet connection between said member and fly-wheel, for communicating power from the motor through said fly-wheel to the shaft, and a friction connection between the fly-wheel and said member, for communicating power from the engine through said fly-wheel to the generator, said fly-wheel having a hub upon which said member is loosely mounted, and said member having sprocket teeth disposed a distance from the inner side of said wheel.

Signed by me at Boundbrook, N. J., this 17th day of July, 1914.

WILLIAM T. HENSLEY.

Witnesses:
R. L. REED.
FLORENCE A. HOSKING.